(12) United States Patent
Luczak et al.

(10) Patent No.: US 9,413,927 B2
(45) Date of Patent: Aug. 9, 2016

(54) METHOD FOR PROCESSING WIDE ANGLE IMAGES WITH BARREL DISTORTION AND A SURVEILLANCE SYSTEM

(71) Applicant: POLITECHNIKA POZNANSKA, Poznan (PL)

(72) Inventors: Adam Luczak, Poznan (PL); Slawomir Mackowiak, Poznan (PL)

(73) Assignee: POLITECHNIKA POZNANSKA, Poznan (PL)

( * ) Notice: Subject to any disclaimer, the term of this patent is extended or adjusted under 35 U.S.C. 154(b) by 508 days.

(21) Appl. No.: 13/964,114

(22) Filed: Aug. 12, 2013

(65) Prior Publication Data
US 2014/0043477 A1 Feb. 13, 2014

(30) Foreign Application Priority Data

Aug. 13, 2012 (PL) .......................................... 400346

(51) Int. Cl.
*H04N 5/217* (2011.01)
*H04N 7/18* (2006.01)
*G06T 3/00* (2006.01)
*G06T 5/00* (2006.01)

(52) U.S. Cl.
CPC .............. *H04N 5/217* (2013.01); *G06T 3/0062* (2013.01); *G06T 5/006* (2013.01); *H04N 7/18* (2013.01); *G06T 2207/10004* (2013.01); *G06T 2207/20021* (2013.01); *G06T 2207/20104* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 5,185,667 A | 2/1993 | Zimmermann | |
| 8,547,431 B2* | 10/2013 | Williams | .......... G06F 17/30247 348/135 |
| 2006/0028550 A1 | 2/2006 | Palmer, Jr. | |
| 2007/0098296 A1* | 5/2007 | Souchard | .............. G06T 3/0018 382/275 |
| 2007/0211955 A1* | 9/2007 | Pan | ....................... G06T 3/0043 382/254 |
| 2008/0129723 A1 | 6/2008 | Comer et al. | |
| 2010/0179691 A1 | 7/2010 | Gal et al. | |

OTHER PUBLICATIONS

SENTRY360SECURITY:"FullSight 360-degree camera tutorial. avi", (Apr. 15, 2010), XP054975474, Retrieved from the Internet: URL:http://www.youtube.com/watch?v=K4__f8CdOQxA [retrieved on Jul. 24, 2014].

(Continued)

*Primary Examiner* — Michael Teitelbaum
(74) *Attorney, Agent, or Firm* — Mark M. Friedman

(57) ABSTRACT

A computer-implemented method for processing a distorted wide angle image with barrel distortion to obtain a plurality of reconstructed images, characterized in that it comprises the steps of: determining, on the basis of a mapping function representing the distortion of the distorted image, a reconstruction function representing the position of points ($r_0$) of reconstructed image as a function of position of points ($r_1$) on the distorted image, determining a plurality of viewing angles ($\alpha_1$, $\alpha_2$, $\alpha_3$), for each viewing angle ($\alpha_1$, $\alpha_2$, $\alpha_3$), generating a reconstructed image comprising points of the distorted image comprised within the particular viewing angle ($\alpha_1$, $\alpha_2$, $\alpha_3$) and reconstructed using the reconstruction function, such that each reconstructed image has its central point corresponding to the same point of the distorted image.

13 Claims, 6 Drawing Sheets

(56) References Cited

OTHER PUBLICATIONS

Smith P et al: "Integrating and employing multiple levels of zoom for activity recognition", Proceedings of the 2004 IEEE Computer Society Conference on Computer Vision and Pattern Recognition Jun. 27-Jul. 2, 2004 Washington, DC, USA, IEEE, Proceedings of the 2004 IEEE Computer Society Conference on Computer Vision and Pattern Recognition IEE, VO.2, Jun. 27, 2004, pp. 928-935, XP010708695, DOI: 10.1109/CVPR.2004.1315265, ISBN: 978-0-7695-2158-9.

Adam Luczak et al: "A Large Barrel Distortion in an Acquisition System for Multifocal Images Extraction", Sep. 24, 2012, Computer Vision and Graphics, Springer Berlin Heidelberg, Berlin, Heidelberg, pp. 164-171, XP047020374, ISBN: 978-3-642-33563-1.

Anonymous: "math-correcting fisheye distortion programmatically—Stack Overflow", May 26, 2012, pp. 1-9, XP055091073, https://web.archive.org Retrieved from the Internet: URL:https://web.archive.org/web/20120526122813/http://stackoverflow.com/questions/2477774/correcting-fisheye-distortion-programmatically [retrieved on Dec. 2, 2013].

* cited by examiner

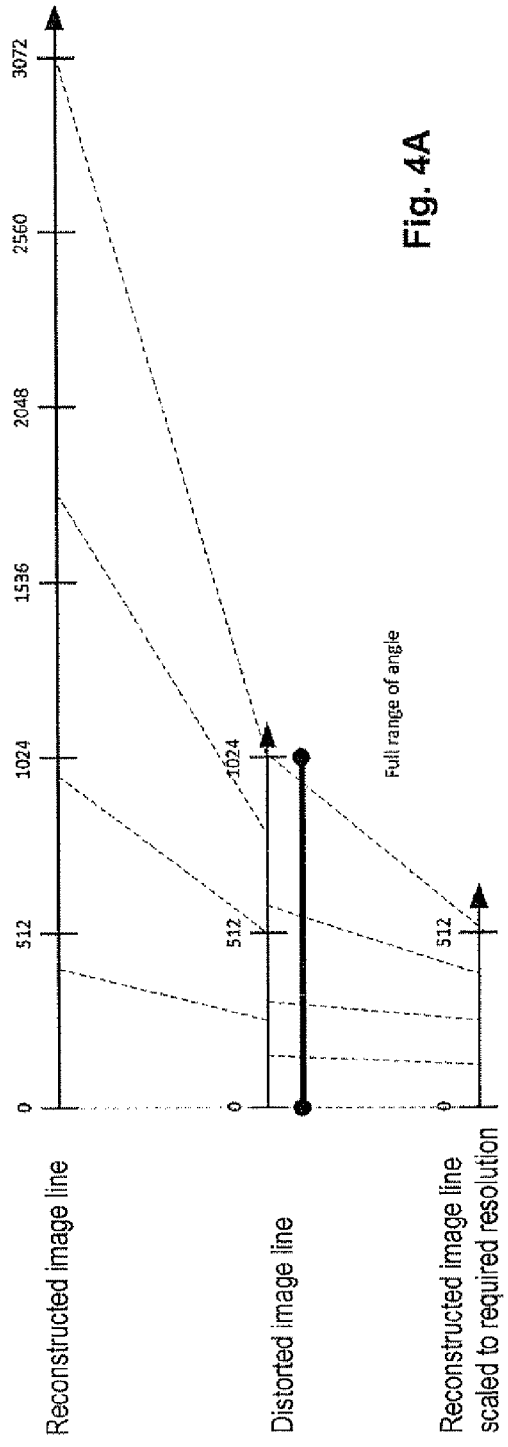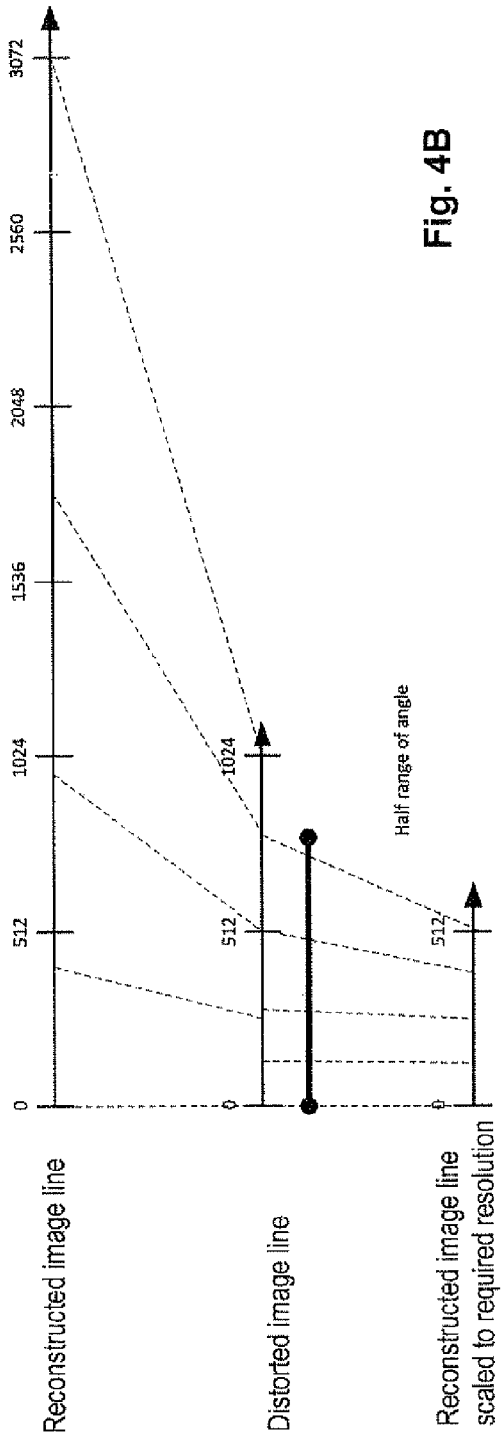

METHOD FOR PROCESSING WIDE ANGLE IMAGES WITH BARREL DISTORTION AND A SURVEILLANCE SYSTEM

BACKGROUND

The object of the invention is a method for processing wide angle images with barrel distortion, in particular in order to obtain a plurality of images of a different angular resolutions to be used in visual surveillance systems.

Visual surveillance systems are used to observe an area. In particular, real-time observation systems can be used by a security guard to monitor the behaviour of people in a given area, such as a sports stadium. Such systems require cameras with high zoom capabilities and high resolution, in order to efficiently track behaviour of selected individuals of interest. However, when the observed person moves quickly across the area of sight, it is relatively hard to track the person's path of movement, which may easily go outside the viewing range. The cameras must therefore provide quick zooming capabilities in order to quickly change the viewing angular resolution. Typical narrow-angle cameras provide adequate viewing resolution, but they need sophisticated electronic and mechanical systems to provide adequate zooming and movement capabilities.

There are known wide-angle cameras, such as cameras with a fisheye lens, which produce a wide panoramic image. They can be used to observe an area larger than for narrow-angle lens, at the cost of barrel-type distortion. There are known algorithms to convert the distorted image produced by a fisheye lens to a reconstructed rectangular image, at the cost of decrease of resolution close to the image boundary.

In order to obtain a high-quality image of a large area for a surveillance system, a camera with a fisheye lens and large-resolution image sensor could be used. However, high-resolution images need high processing power. Therefore, the currently available typical high-resolution surveillance systems provide high quality images, but at a low frame rate, typically not exceeding a few frames per second. Increase of the frame rate requires substantial processing power, which significantly increases the cost of the system.

It would be therefore desirable to provide a surveillance system enabling wide observation angle, quick zooming capabilities and low processing power requirements in order to provide image at a high frame rate.

There are known various algorithms for processing barrel-distorted images.

An article "A Real-time FPGA Implementation of a Barrel Distortion Correction Algorithm with Bilinear Interpolation" (K. T. Gribbon et al, Proceedings of Image and Vision Computing New Zealand, 2003) discloses FPGA implementation of a barrel distortion correction algorithm with a focus on reducing hardware complexity. In order to perform real-time correction in hardware the undistorted output pixels must be produced in raster order. To do this the implementation uses the current scan position in the undistorted image to calculate which pixel in the distorted image to display. The magnification factor needed in this calculation is stored in a special look-up table that reduces the complexity of the hardware design, without significant loss of precision. The application of bilinear interpolation to improve the quality of the reconstructed image is also discussed and a real-time approach is presented.

The following articles present further methods for processing barrel-distorted images:

"Nonparametric correction of distortion" (Stevenson D. E. et al, Technical report TR 95-07, University of Iowa, Computer Science), "Non-metric calibration of wide-angle lenses and polycameras" (Swaminathan R. et al, IEEE Computer Society Conference CVPR 99, Vol. 2, pp. 413-419, 1999)

"A versatile camera calibration technique for high-accuracy 3D machine Visio metrology using off-the-shelf TV cameras and lenses." (Tsai R. Y, IEEE Journal of Robotics and Automation, Vol. RA-3, No. 4, pp. 323-344, August 1987)

"Robot Aerobics: Four Easy Steps to a More Flexible Calibration" (Stevenson D. E. et al, Intern. Conf. on Computer Vision, pp. 34-39, 1995)

"Simultaneous linear estimation of multiple view geometry and lens distortion", (Fitzgibbon, A. W., CVPR2001).

It is also known to improve distortion in order to improve image quality in postproduction to represent an image on small-diameter screens. Methods of this type have been disclosed in "Applying and removing lens distortion in post production" (G. Vass et al, Camera (2003), Pages: 9-16) and "Applying image quality in cell phone cameras: lens distortion" (D. Baxter, Proceedings of SPIE (2009)).

Barrel distortion curves for fisheye lens are discussed in "Fisheye lens designs and their relative performance" (J. "Jay" Kumlera at al, Proc. SPIE, vol. 4093, pp. 360-369, 2000) and "Accuracy of fish-eye lens models" (C. Hughes at al, Applied Optics, Vol. 49, Issue 17, pp. 3338-3347 (2010)).

SUMMARY

The aim of the invention is to provide a method for processing wide angle images with barrel distortion in order to obtain a plurality of images of a different angular resolutions to be used in visual surveillance systems, the method being characterized in optimized computational requirements.

The object of the invention is a computer-implemented method for processing a distorted wide angle image with barrel distortion to obtain a plurality of reconstructed images, which comprises the steps of: determining, on the basis of a mapping function representing the distortion of the distorted image, a reconstruction function representing the position of points ($r_0$) of reconstructed image as a function of position of points ($r_1$) on the distorted image, determining a plurality of viewing angles ($\alpha_1, \alpha_2, \alpha_3$), for each viewing angle ($\alpha_1, \alpha_2, \alpha_3$), generating a reconstructed image comprising points of the distorted image comprised within the particular viewing angle ($\alpha_1, \alpha_2, \alpha_3$) and reconstructed using the reconstruction function, such that each reconstructed image has its central point corresponding to the same point of the distorted image.

Preferably, each reconstructed image has dimensions which are not greater than the dimensions of the distorted image.

Preferably, each reconstructed image has the same dimensions.

Preferably, the method further comprises the step of generating a display screen comprising at least two reconstructed images corresponding to different viewing angles ($\alpha_1, \alpha_2, \alpha_3$).

Preferably, the method further comprises the step of determining at least one viewing angle ($\alpha$) in response to an input received via a user interface.

Preferably, the method further comprises the step of identifying a graphical object on one of the images and highlighting the points corresponding to the identified object on at least two of the reconstructed images.

Preferably, at least two reconstructed images are generated using the reconstruction function which has a different scale coefficient ($f_a$, $f_b$) for each reconstructed image.

Preferably, the method further comprises the step of identifying coordinates of object on a reconstructed image as a function of the coordinates of that object on another reconstructed image and a quotient of scale coefficients ($f_a$, $f_b$) for that reconstructed images.

The object of the invention is also a computer program comprising program code means for performing all the steps of the method according to the invention when said program is run on a computer.

The invention also relates to a surveillance system comprising a camera with wide angle lens coupled with an image sensor providing a distorted wide angle image with barrel distortion, the system further comprising: an image processor configured to: determine, on the basis of a mapping function representing the distortion of the distorted image, a reconstruction function representing the position of points ($r_0$) of reconstructed image as a function of position of points ($r_1$) on the distorted image, determine a plurality of viewing angles ($\alpha_1$, $\alpha_2$, $\alpha_3$), for each viewing angle ($\alpha_1$, $\alpha_2$, $\alpha_3$), generate a reconstructed image comprising points of the distorted image comprised within the particular viewing angle ($\alpha_1$, $\alpha_2$, $\alpha_3$) and reconstructed using the reconstruction function, such that each reconstructed image has its central point corresponding to the same point of the distorted image.

Preferably, each reconstructed image has dimensions which are not greater than the dimensions of the distorted image.

Preferably, each reconstructed image has the same dimensions.

Preferably, the system further comprises a display interface configured to generate a display screen comprising at least two reconstructed images corresponding to different viewing angles ($\alpha_1$, $\alpha_2$, $\alpha_3$).

Preferably, the image processor is further configured to determine at least one viewing angle ($\alpha$) in response to an input received via a user interface.

Preferably, the image processor is further configured to identify a graphical object on one of the images and highlighting the points corresponding to the identified object on at least two of the reconstructed images.

BRIEF DESCRIPTION OF DRAWINGS

The present invention is shown by means of exemplary embodiment on a drawing, in which:

FIGS. 4A and 4B show exemplary calculation of points from one line of distorted image to a reconstructed image for a full viewing angle and half viewing angle, respectively;

FIGS. 5A-5D show exemplary images of different viewing angles generated from a distorted image (5A), wherein FIG. 5B shows a reconstructed image for a full viewing angle (wide-angle image), FIG. 5C shows a reconstructed image for a narrow viewing angle, and FIG. 5D shows a reconstructed image for an intermediate viewing angle.

DETAILED DESCRIPTION

The present invention enables to obtain, from a single distorted image obtained from a wide angle lens camera, a plurality of reconstructed images having selectable angular resolution. It provides the effect of immediate, smooth change of focal length for fixed focal length lens, which is particularly useful for the purpose of tracking an object captured by the surveillance system camera.

Figure 1:
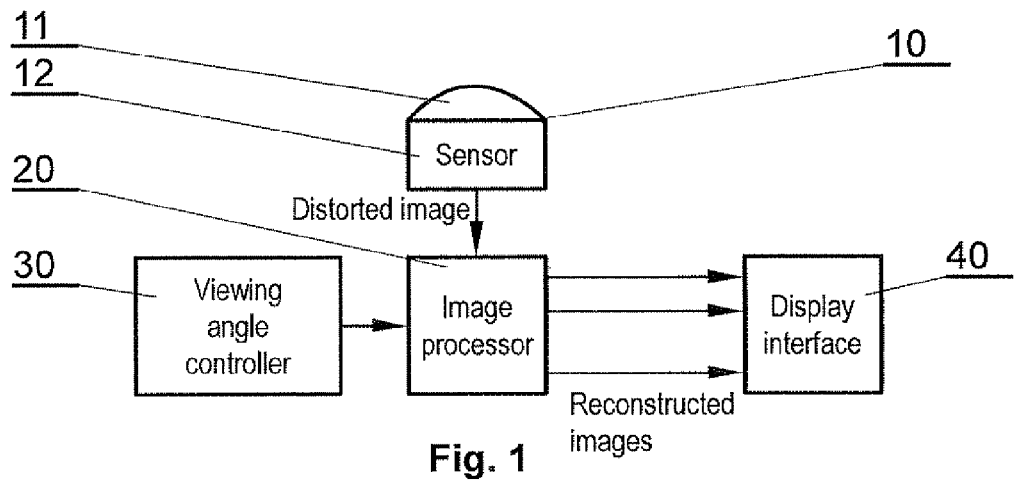
FIG. 1 shows an exemplary structure of a surveillance system.

FIG. 1 shows an exemplary structure of a surveillance system according to the present invention. The system comprises a camera 10 with a wide-angle lens 11 such as fisheye lens, for receiving an original image, coupled with a digital sensor 12 for capturing the distorted image generated by the lens 11. The distorted image is sent from the sensor 12 to a processor 20. The operation of the processor 20 is controlled by a viewing angle controller 30, which specifies a plurality of viewing angles. For each specified viewing angle, the processor 20 generates a reconstructed image that corresponds to that viewing angle and sends it to a display interface 40 to be presented to the user of the surveillance system.

The present invention is applicable to wide-viewing angle lens. As an exemplary embodiment, fisheye lens with barrel-type distortion will be presented. Persons skilled in the optics will recognize that the principles underlying the invention can be applied to other types of equivalent lens.

In a fisheye lens with barrel distortion, the image area is calculated using a particular mapping function, such as:

$$\begin{aligned} \text{equidistant} \quad & r = f\alpha, \\ \text{stereographic} \quad & r = 2f\tan\left(\frac{\alpha}{2}\right), \\ \text{orthographic} \quad & r = f\sin(\alpha), \\ \text{equisolid angle} \quad & r = 2f\sin\left(\frac{\alpha}{2}\right) \end{aligned}$$

The present invention is particularly effective with orthographic and equisolid angle mapping, as they highly compensate the edges of the frame, and therefore provide better resolution in the centre of the frame.

A lens which does not distort the space (all lines in the image are straight) transforms the points viewed at angle $\alpha$ to a position of points on the sensor according to a formula:

$$r_0 = f_0 \tan(k_0 \alpha) \quad (1)$$

wherein $r_0$ represents the distance between the point and the centre of the sensor, and parameters $k_0$ and $f_0$ are characteristic for the particular lens and represent the scale of the transformation and distance between the focus point and the sensor, respectively. The distance $f_0$ influences the size of the distorted image generated in the sensor.

Figure 2:
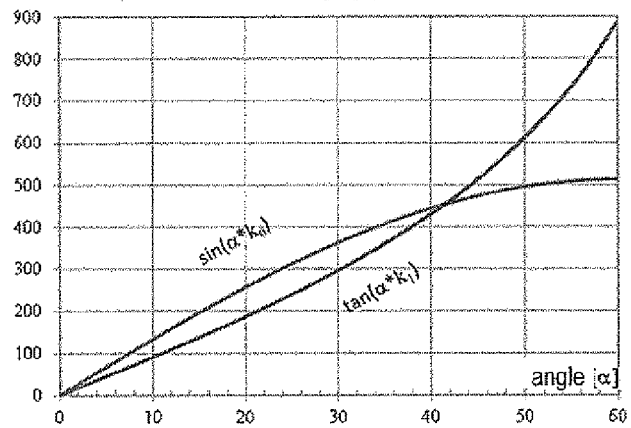
FIG. 2 shows plots of functions transforming the viewing area.
Figure 3:
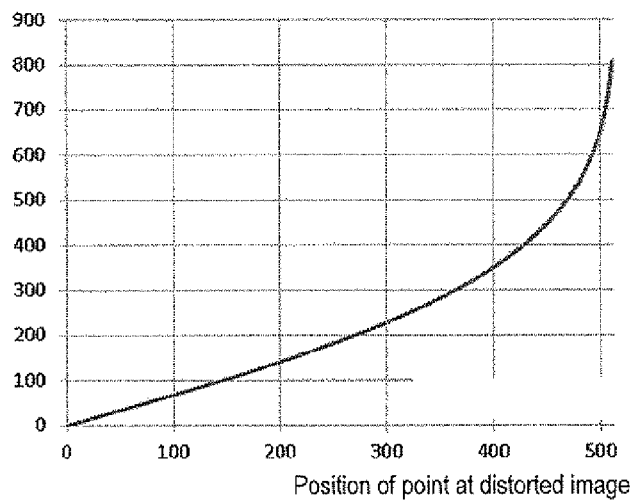
FIG. 3 shows exemplary calculation of position of points using a reconstruction function.
Figure 5A:
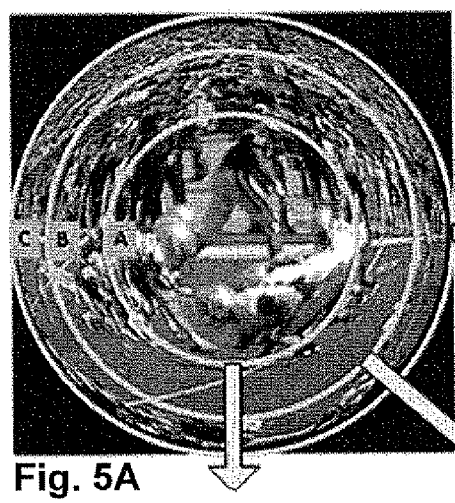
Figure 5B:
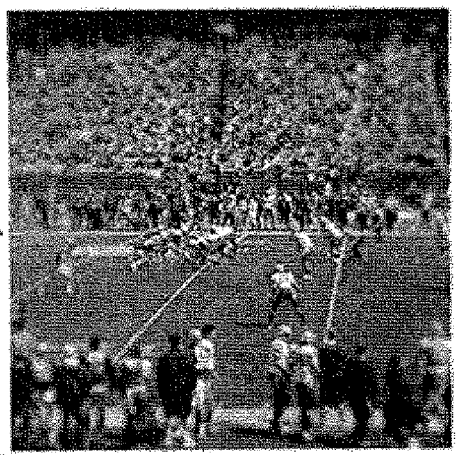
Figure 5C:
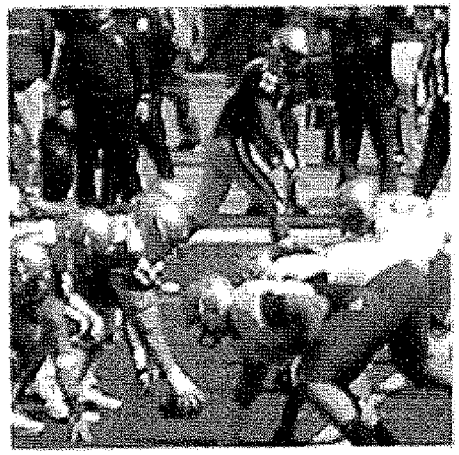
Figure 5D:
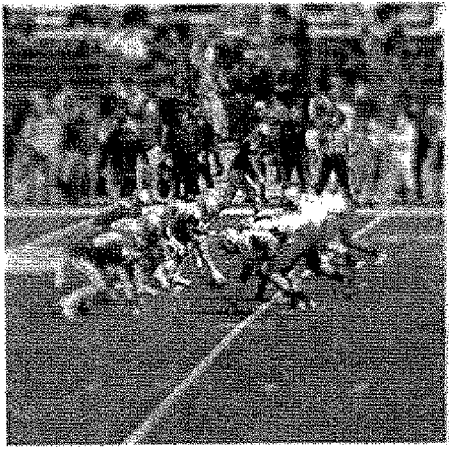
Figure 6:
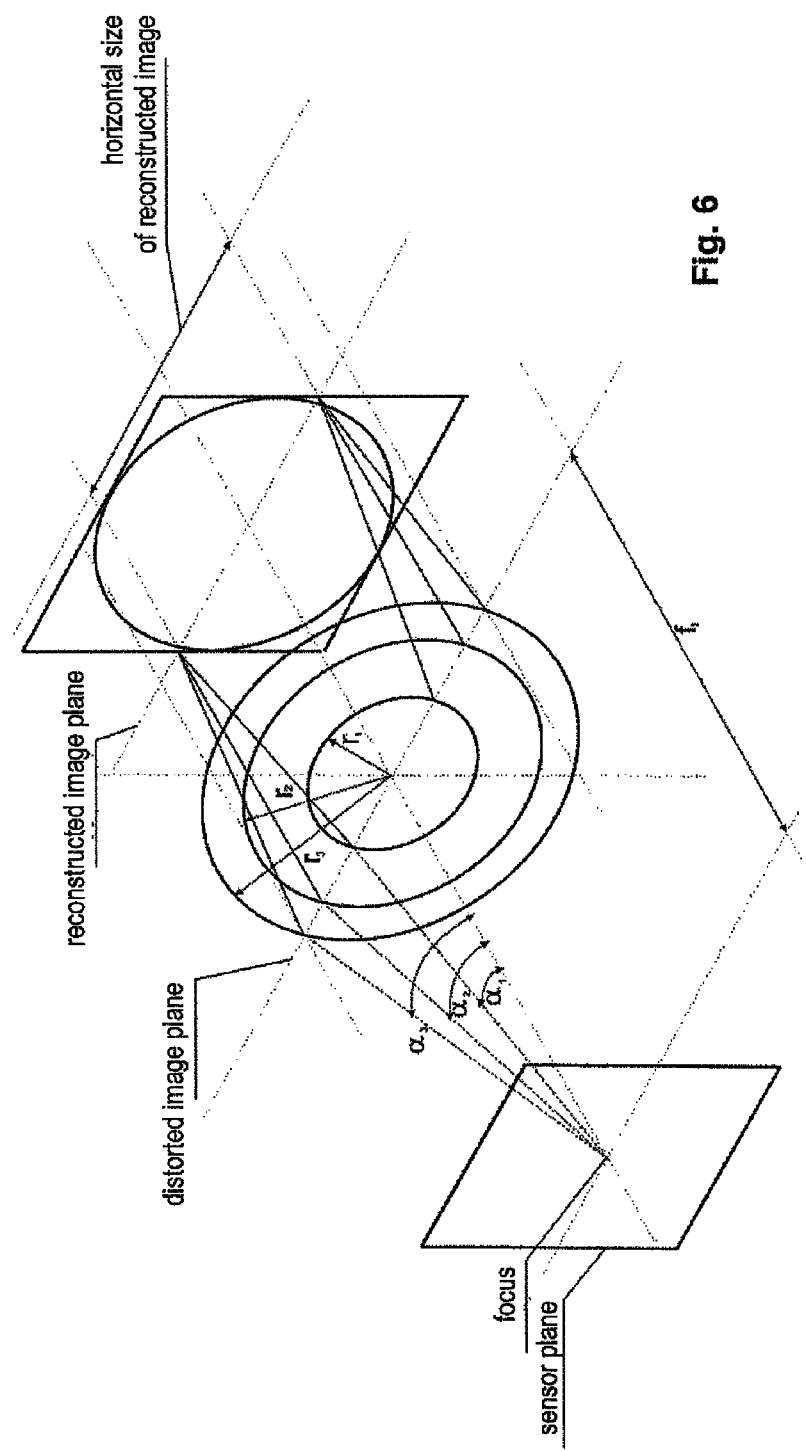
FIG. 6 shows dependencies between the distorted image and reconstructed image.

However, for a lens with significant compression of frame edges, which is applicable for the present invention, the distortion is represented by a formula corresponding to a mapping function. For example, for orthographic mapping function, the following formula can be applicable:

$$r_1 = f_1 \sin(k_1 \alpha) \quad (2)$$

wherein $r_1$ is the radius of a circle positioned in the centre of the sensor, which determines the fragment of the distorted image of FIG. 5A and FIG. 6 (dependencies between the distorted image and reconstructed image). The plots of the functions are shown in FIG. 2.

In the present invention, in order to obtain a reconstructed image, the distorted image is transformed using a function which is a combination of functions (1) and (2) assuming that we are looking for position of points for a specific angle α.

Therefore, from equation (2) it can be inferred that the angle α is given by:

$$\alpha = \frac{1}{k_1}\sin^{-1}\left(\frac{r_1}{f_1}\right)$$

Then by substituting α to equation (1) one obtains a reconstruction function:

$$r_o = f_o \tan\left(\frac{k_o}{k_1}\sin^{-1}\left(\frac{r_1}{f_1}\right)\right) \quad (4)$$

The reconstruction function (4), plotted on FIG. 4, is used to calculate the position of a point ($r_0$) in the reconstructed image based on position of that point ($r_1$) in the distorted image. It will be evident for a skilled person that the reconstruction function (4) depends on the mapping function used.

Figure 7:
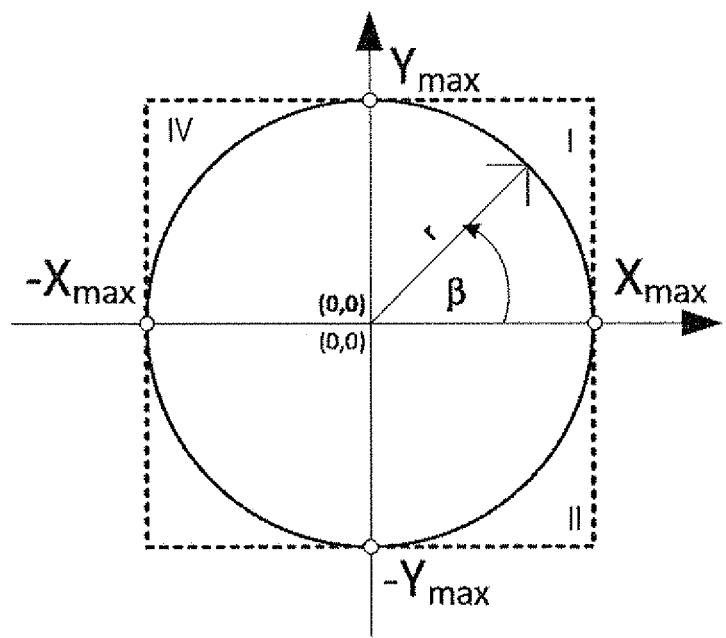
FIG. 7 shows schematically the transition between the distorted image and the reconstructed image.

The reconstructed image is generated, as shown schematically on FIG. 7, by generating rectangular intermediate images representing quarters I, II, III, IV of the distorted image. Each intermediate image is generated using formula:

$$P_{reconstructed}(x,y) = P_{distorted}(r, \beta)$$

First, initial values of pixels x' and y' are calculated using formulas:

$$x' = f_0 \tan\left(\frac{k_0}{k_1}\sin^{-1}\left(\frac{r}{f_1}\right)\right)\cos(\beta)$$

$$y' = f_0 \tan\left(\frac{k_0}{k_1}\sin^{-1}\left(\frac{r}{f_1}\right)\right)\sin(\beta)$$

Next, the initial values of $P'_{reconstructed}(x', y')$ have their signs corrected depending on the quarter and the values are scaled depending on the desired size of the reconstructed image $P_{reconstructed}(x, y)$. For example, in case no scaling is used (the size of the reconstructed image is to be equal to the diameter of the distorted image), the following formulas are used:

$$x = x' + x'_{max}$$

$$y = y'_{max} - (y' + y'_{max})$$

wherein $x'_{max}$ and $y'_{max}$ are the maximum values corresponding to the maximum distance r (in case of a perfectly round image).

For computational efficiency, it is most preferable when all reconstructed images have a size smaller than the distorted image. Moreover, it is preferable that the size of all reconstructed images is equal. The sizing of the images is achieved by adequate interpolation or extrapolation of information from the disrupted image.

The present invention improves the efficiency of the surveillance systems by providing a plurality of reconstructed images from a distorted image obtained from single sensor, the reconstructed images having different angular resolutions, in a method which does not require substantial processing power requirements.

Due to small computational resources necessary to generate the reconstructed images, a plurality of reconstructed images can be displayed on a single screen and updated with a high frequency, e.g. 25 frames/second. The user interface screen may have a form e.g. such as shown on the page comprising FIGS. 5A-5D, i.e. showing three reconstructed images on the same screen. Due to the fact that a plurality of images are displayed on screen, if the object tracked by the camera leaves the area of the image with the narrowest viewing angle (i.e. providing the largest zoom), the object can be instantaneously spotted on the other images providing wider viewing angle. As the zooming functionality is provided by computation and not by mechanics of the camera, the camera only needs a mechanical system to control its position, which makes it less costly to manufacture.

Figure 8:
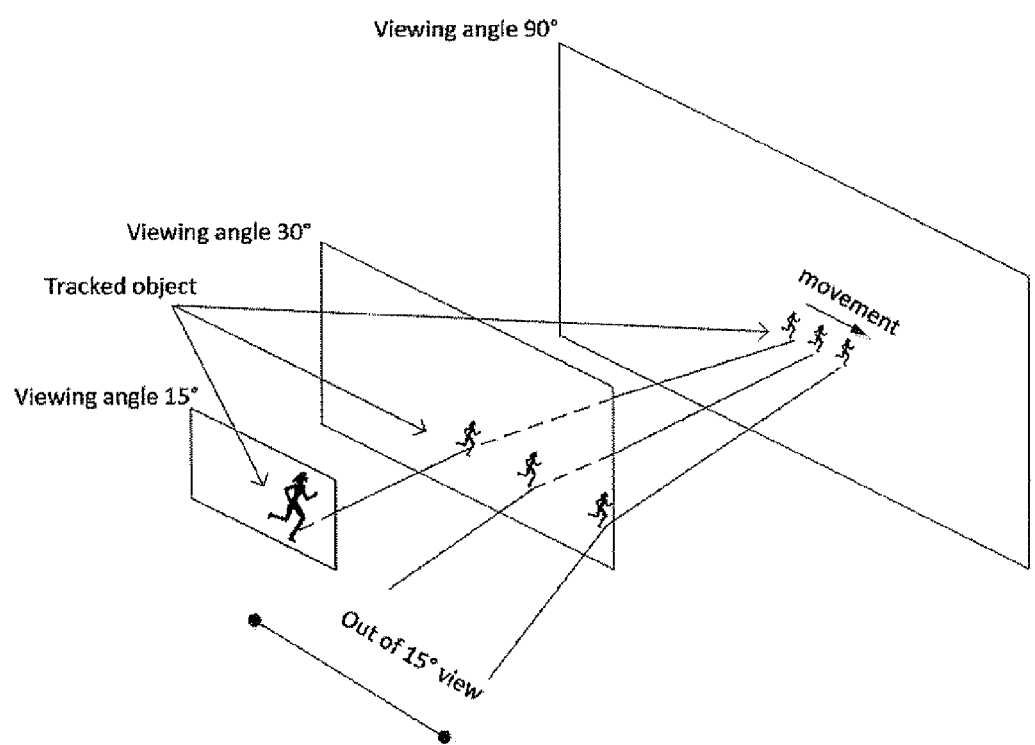
FIG. 8 shows a situation of object tracking in a surveillance system by using multiple images of different viewing angles.

FIG. 8 shows a situation of object tracking in a surveillance system by using multiple images of different viewing angles. In most applications of surveillance systems the main area of interest is the centre of the image, where the object being tracked is located (due to action of system operator or automatic object-following systems). However, when the object moves quickly, it may easily escape the current view in a narrow-angle camera. In a wide-angle camera, however, the view covers an area of 180 degrees or more, and therefore in practical situations the object is always within the sight of the widest viewing angle. Even if the object moves close to the boundary of the widest image, it is still visible on the image (although at a lower resolution at the boundary) and due to that fact it is easier to track the object to point the centre of the sight to that object. Moreover, by knowing the coordinates of the object at a particular image, i.e. its distance from the centre of the image, it is easy to calculate the displacement of the camera lens necessary to centre the image at the object. In order to facilitate object tracking, additional algorithms could be employed to identify a graphical object on one of the images and highlight the points corresponding to the identified object on at least two of the reconstructed images.

The following example illustrates how to determine the position of a specific object on different images.

Assume image A (e.g. the image with 15 degrees viewing angle on FIG. 8) is generated using the following reconstruction formula:

$$r_a = f_a \tan\left(\frac{k_a}{k_1}\sin^{-1}\left(\frac{r_i}{f_1}\right)\right)$$

Assume image B (e.g. the image with 90 degrees viewing angle on FIG. 8) is generated using the following reconstruction formula:

$$r_b = f_b \tan\left(\frac{k_b}{k_1}\sin^{-1}\left(\frac{r_i}{f_1}\right)\right)$$

The coefficients $f_a$ and $f_b$ are used to scale the size of the image and the coefficients $k_a$ and $k_b$ must be the same to reconstruct images of different viewing angles according to the same curve. Let's assume determination of new coefficients in relation to the image centre (point 0,0 in the centre of the image).

The different coefficients (x, y) for images A and B are to represent the same point, i.e. the point which lies on the same circle having a radius $r_i$ in the distorted image. Therefore, the same point on a circle having radius $r_i$ is present on images A and B on circles having a radius, respectively, $r_a$ and $r_b$.

Therefore, we are looking for a scale coefficient which will allow transformation of $r_a$ to $r_b$, in order to quickly recalculate coefficients of one image to another image.

The following two cases shall be assessed:
a) images having a wider viewing angle have also a higher size, and images having a narrower viewing angle are comprised within the images of the wider viewing angle. In such case, $f_a=f_b$ and therefore:
The coefficient of coordinates scaling s=1 and:

$$\begin{cases} x_b = x_a \\ y_b = y_a \end{cases}$$

b) images having different viewing angles have the same size. In such case, $f_a < > f_b$ and therefore:
The scale coefficient:

$$s = \frac{r_b}{r_a} = \frac{f_b}{f_a}$$

$$\begin{cases} x_b = s * x_a = \frac{f_b}{f_a} * x_a \\ y_b = s * y_a = \frac{f_b}{f_a} * y_a \end{cases}$$

In general, for images A and B having arbitrary sizes which are transformed using the same characteristics, the transformation of coefficients is represented by:

$$\begin{cases} x_b = \frac{f_b}{f_a} * x_a \\ y_b = \frac{f_b}{f_a} * y_a \end{cases}$$

Taking the above into account, it is evident that the present invention enables very quick and easy calculation of coefficients of an object visible on one reconstructed image to coefficients of that object on another reconstructed image.

What is claimed is:

1. A computer-implemented method for processing a distorted wide angle image with a barrel distortion, the method comprising the steps of:
    determining, on a basis of a mapping function representing a distortion of said distorted image, a reconstruction function representing a position of points of a reconstructed image as a function of a position of points of said distorted image and a scale coefficient,
    determining a plurality of different viewing angles,
    for each viewing angle of the plurality of different viewing angles generating a reconstructed image comprising the points of said distorted image comprised within, said viewing angle and reconstructed using said reconstruction function with a different scale coefficient for each of said reconstructed images;
    wherein each of said reconstructed images has its central point corresponding to the same point of said distorted image;
    identifying coordinates of an object on one of said reconstructed images as a function of coordinates of that object on another one of said reconstructed images and a quotient of scale coefficients of the reconstruction functions used for generating that reconstructed images.

2. The method according to claim 1, wherein each of said reconstructed images has dimensions which are not greater than dimensions of said distorted image.

3. The method according to claim 1, wherein each of said reconstructed images has the same dimensions.

4. The method according to claim 1, further comprising the step of generating a display screen comprising at least two of said reconstructed images.

5. The method according to claim 1, further comprising the step of determining at least one viewing angle in response to an input received via a user interface.

6. The method according to claim 1, further comprising the step of identifying a graphical object on one of said reconstructed images and highlighting points corresponding to said graphical object on at least two of said reconstructed images.

7. A non-transitory computer readable medium comprising program code means for performing, when said program is run on a computer, processing a distorted wide angle image with a barrel distortion by the following steps:
    determining, on a basis of a mapping function representing a distortion of said distorted image, a reconstruction function representing a position of points of a reconstructed image as a function of a position of points of said distorted image and a scale coefficient,
    determining a plurality of different viewing angles,
    for each viewing angle of the plurality of different viewing angles, generating a reconstructed image comprising the points of said distorted image comprised within said viewing angle and reconstructed using said reconstruction function with a different scale coefficient for each of said reconstructed images;
    wherein each of said reconstructed images has its central point corresponding to the same point of said distorted image;
    identifying coordinates of an object on one of said reconstructed images as a function of coordinates of that object on another one of said reconstructed images and a quotient of scale coefficients of the reconstruction functions used for generating that reconstructed images.

8. A surveillance system comprising a camera with a wide angle lens coupled with an image sensor providing a distorted wide angle image with a barrel distortion, the system further comprising an image processor configured to:
    determine, on a basis of a mapping function representing a distortion of said distorted image, a reconstruction function representing a position of points of a reconstructed image as a function of a position of points of said distorted image and a scale coefficient,
    determine a plurality of different viewing angles,
    for each viewing angle of the plurality of different viewing angles generate a reconstructed image comprising the points of said distorted image comprised within said viewing angle and reconstructed using said reconstruction function with a different scale coefficient for each of said reconstructed images;
    wherein each of said reconstructed images has its central point corresponding to the same point of said distorted image;
    identify coordinates of an object on one of said reconstructed images as a function of coordinates of that object on another one of said reconstructed images and a quotient of scale coefficients of the reconstruction functions used for generating that reconstructed images.

9. The system according w claim 8, wherein each, of said reconstructed images has dimensions which are not greater than the dimensions of said distorted image.

10. The system according to claim 8, wherein each of said reconstructed images has the same dimensions.

11. The system according to claim 8, further comprising a display interface configured to generate a display screen comprising at least two of said reconstructed images.

12. The system according to claim 8, wherein said image processor is further configured to determine at least one viewing angle in response to an input received via a user interface.

13. The system according to claim 8, wherein said image processor is further configured to identify a graphical object on one of said reconstructed images and to highlight points corresponding to said graphical object on at least two of said reconstructed images.

* * * * *